United States Patent [19]

Hoblingre

[11] Patent Number: 5,213,004
[45] Date of Patent: May 25, 1993

[54] DEVICE FOR LOCKING IN POSITION THE ADJUSTABLE STEERING COLUMN OF A MOTOR VEHICLE

[75] Inventor: Andre Hoblingre, Valentigney, France

[73] Assignee: ECIA, Audincourt, France

[21] Appl. No.: 811,586

[22] Filed: Dec. 20, 1991

[30] Foreign Application Priority Data

Dec. 28, 1990 [FR] France .................. 90 16494

[51] Int. Cl.[5] ........................... B62D 1/18
[52] U.S. Cl. .................. 74/493; 74/99 A; 74/528; 403/92
[58] Field of Search .......... 74/471 XY, 493, 528, 74/531, 99 A; 403/92, 93, 96; 192/93 A; 280/775

[56] References Cited

U.S. PATENT DOCUMENTS

| 1,829,551 | 10/1931 | Wambsgans | 403/93 |
|---|---|---|---|
| 4,244,237 | 1/1981 | Sprunger | 74/493 |
| 4,267,742 | 5/1981 | Cabeza | 74/471 XY |
| 4,279,176 | 7/1981 | Minamitani | 74/493 |
| 4,522,394 | 6/1985 | Broussard | 74/528 X |
| 4,541,298 | 9/1985 | Strutt | 74/493 |
| 5,022,861 | 6/1991 | Aoto | 403/96 X |

FOREIGN PATENT DOCUMENTS

242928 10/1987 European Pat. Off. .
377348 7/1990 European Pat. Off. .
2113164 8/1983 United Kingdom .

Primary Examiner—Allan D. Herrmann
Assistant Examiner—David W. Laub
Attorney, Agent, or Firm—Sughrue, Mion, Zinn, Macpeak & Seas

[57] ABSTRACT

This device comprising a column support structure, connected to the rest of the vehicle and comprising two side plates between which is arranged the column and mechanisms for locking the column, which mechanisms comprise a tie rod (20) extending between the side plates, bearing against one of the side plates and connected to locking elements comprising a stop component (24), an intermediate support component (25) and an operating component (26) arranged between the stop component and the intermediate support component, connected to an operating lever (27) and movable in rotation in a plane perpendicular to the tie rod, one of the facing surfaces of the operating component (26) and of the intermediate support component (25) or of the stop component (24) comprising at least one projecting part (30, 31) adapted to cooperate with a ramp (28, 29) of the other, so as to separate these two surfaces from one another and hence the corresponding locking elements so as to bring the side plates together in order to lock the column, is characterized in that the projecting part comprises a rolling bearing component connected to the corresponding locking element.

6 Claims, 3 Drawing Sheets

5,213,004

DEVICE FOR LOCKING IN POSITION THE ADJUSTABLE STEERING COLUMN OF A MOTOR VEHICLE

BACKGROUND OF THE INVENTION

The present invention relates to a device for locking in position the adjustable steering column of a motor vehicle.

Certain motor vehicles have for some years been fitted with devices for adjusting the position of the steering wheel, with the aim of adapting the position of the latter to the morphology of the driver of the vehicle.

Thus, the position of the column and therefore of the steering wheel is adjustable axially and by pivoting.

In the state of the art, these adjustment devices comprise a column support structure connected to the rest of the structure of the vehicle and comprising two side plates between which is arranged the column and means for locking the column in position by bringing the side plates together.

These locking means comprise for example a tie rod extending between the side plates, whereof a first end bears against one of the side plates and the second is connected to locking elements.

Various embodiments of these locking elements have been proposed.

Thus, for example, these locking elements may be constituted by a screw-nut system, a knuckle joint system, or else a cam-type system, connected to an operating lever.

Another embodiment of these locking means is described in the document GB-A-2,113,164 in the name of FORD MOTOR COMPANY LIMITED.

This document describes in fact a device the general structure of which appears in the form described above and in which the locking elements comprise a stop component at the second end of the tie rod, an intermediate support component in contact with the other side plate of the support structure and movable axially on the tie rod and an operating component arranged between the stop component and the intermediate support component, connected to an operating lever, and movable in rotation in a plane perpendicular to the tie rod, between an active position for locking the column and a retracted position for unlocking the latter.

One of the facing surfaces of the operating component and of the intermediate support component or of the stop component comprises at least one projecting part adapted to cooperate with a ramp of the other, so as to separate these two surfaces from one another and hence the corresponding locking elements so as to bring the side plates together in order to lock the column, when the operating lever is moved.

In the embodiment described in this document, the projecting parts are constituted by projections forming an integral part of the operating component and the ramps arranged on the intermediate support component.

However, this device has a certain number of disadvantages as regards the operation of the lever.

In fact, it will be understood that the more tightly the column has to be gripped, the greater the frictions between these various locking elements and therefore the more difficult it is to operate the lever.

SUMMARY OF THE INVENTION

The object of the invention is to solve these problems by proposing a column locking device in which the operation of the lever is relatively easy.

To this end, the subject of the invention is a locking device as described above, characterized in that the said projecting part comprises a rolling bearing component connected to the corresponding locking element.

Advantageously, two rolling bearing components are arranged on the corresponding locking element, on either side of the tie rod, and are each adapted to cooperate with a facing ramp of the corresponding surface of the other element.

Advantageously, these rolling bearing components are interposed between the operating component and the intermediate support component, and rolling bearing elements are interposed between the stop component and the operating component.

According to a particularly advantageous embodiment, the or each rolling bearing component interposed between the operating component and the intermediate support component and the or each rolling bearing element interposed between the operating component and the stop component of the second end of the tie rod are arranged two by two in the same cavity passing through the operating component, bearing against one another, one projecting between the operating component and the intermediate support component, and the other between the operating component and the stop component.

The invention will be better understood with the help of the following description, given solely as an example and made with reference to the attached drawings, in which:

DESCRIPTION OF PREFERRED EMBODIMENTS

Figure 1:
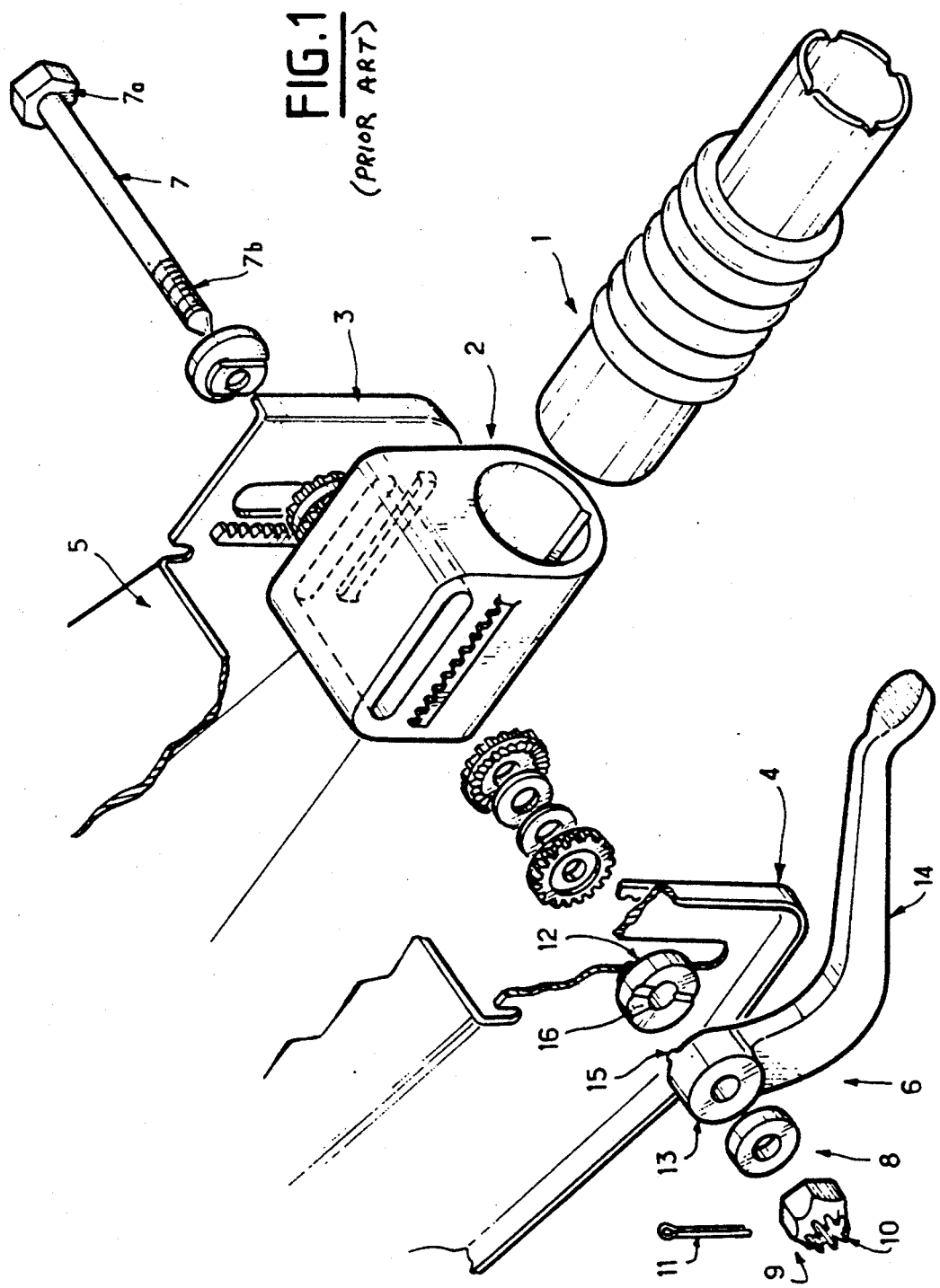
FIG. 1 shows an exploded perspective view of a device for locking in position the adjustable steering column of a vehicle, from the state of the art.

As can be seen in FIG. 1, which shows a device for locking in position the adjustable steering column 1 of a vehicle, from the state of the art, this column 1 is set in a connecting component 2 interposed between the side plates 3 and 4 of a column support structure 5 connected to the rest of the structure of the vehicle by any appropriate means.

This device also comprises means 6 for locking the column in position by bringing together the side plates 3 and 4 of the support structure. These locking means comprise for example a tie rod 7 extending between the two side plates 3 and 4 of the support structure, whereof a first end 7a bears against one of the side plates, for example 3, and whereof the second (opposite) end 7b is connected to locking elements 8.

These locking elements comprise a stop component 9 constituted for example by a nut 10 associated with a split pin 11, and arranged at the second end 7b of the tie rod 7, an intermediate support component 12 in contact with the other side plate 4 of the support structure and movable axially on the tie rod 7 and lastly an operating component 13 arranged between the stop component 9 and the intermediate support component 12, connected to an operating lever 14 and movable in rotation in a plane perpendicular to the tie rod 7, between an active position for locking the column and a retracted position for unlocking the latter.

In the embodiment shown in this figure, one of the facing surfaces of the operating component 13 and of the intermediate support component 12 comprises projecting parts 15 adapted to cooperate with ramps 16 of the other, so as to separate these two surfaces from one another and hence the corresponding locking elements so as to bring the side plates together in order to lock the column in position, when the operating lever is moved.

As was mentioned above, this structure has a certain number of disadvantages, particularly as regards the difficulty of operating the lever because of the frictions between the various locking elements.

Figure 2:
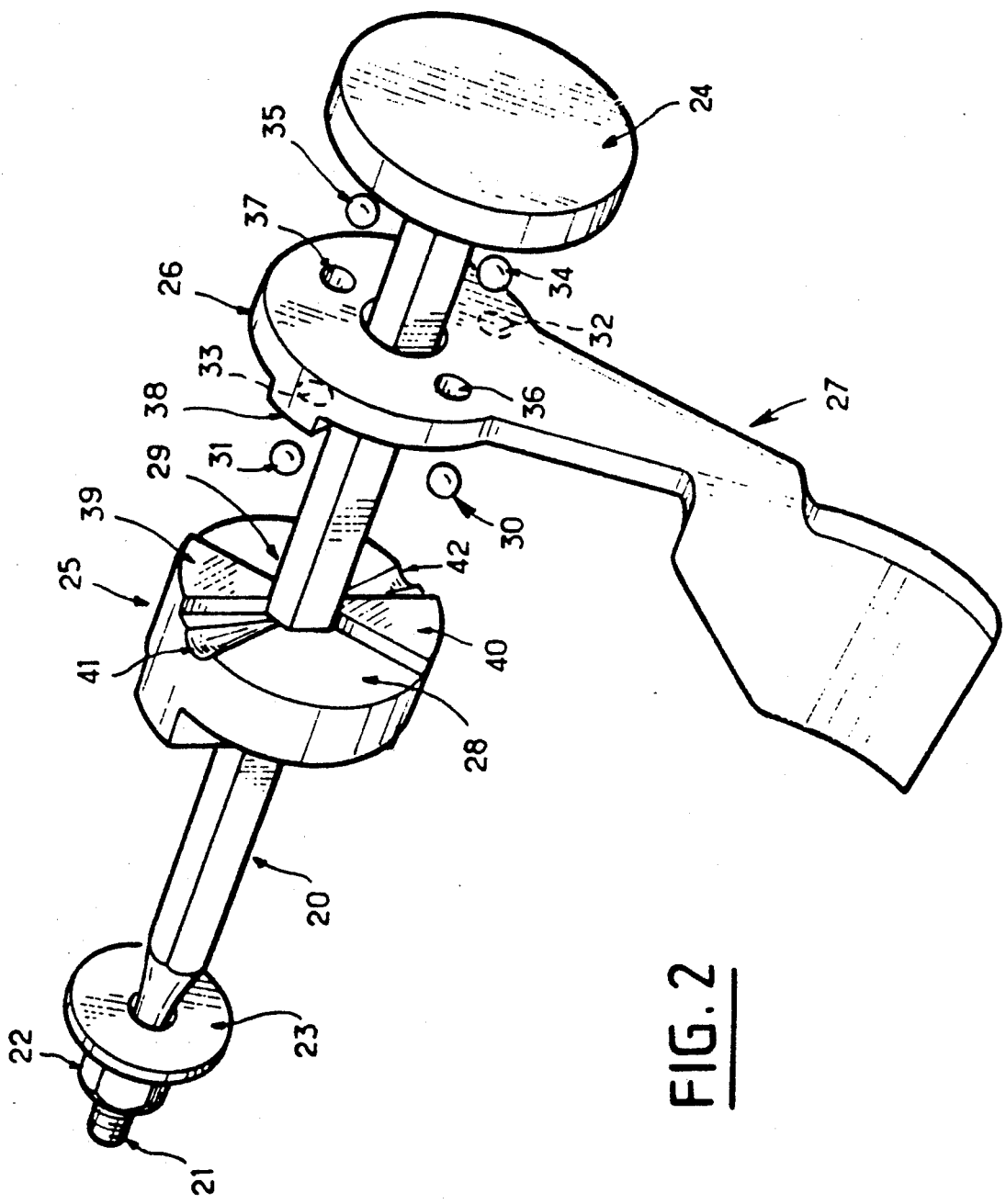
FIG. 2 shows a perspective view of a first embodiment of locking means forming a constituent part of a locking device according to the invention.

With reference now to FIG. 2, which gives a perspective view of locking means forming a constituent part of a device for locking in position, according to the invention, it can be that these means also comprise a tie rod 20 a first end 21 of which is threaded and adapted to cooperate with a nut 22 and a washer 23 for bearing against one of the side plates of the support structure.

It will be noted that the parts of the device not described with respect to this figure may be identical to those described with to FIG. 1.

The second (opposite) end of the tie rod bears locking elements which comprise a stop component 24 constituted for example by a stop plate fixed to the corresponding end of the tie rod 20, and an intermediate support component 25 adapted to bear against the other side plate of the support structure, this intermediate support component being mounted so as to be movable axially on the tie rod.

These locking elements also comprise an operating component 26 arranged between the stop component 24 and the intermediate support component 25, connected to an operating lever 27 and movable in rotation in a plane perpendicular to the tie rod 20 between an active position for locking the column and a retracted position for unlocking the latter.

As can be seen, the surface of the intermediate support component 25 facing the operating component comprises ramps 28 and 29, for example diametrically opposed ramps, which are adapted to cooperate with projecting parts on the corresponding surface of the operating component 26.

More particularly, and according to the invention, these projecting parts may be constituted by rolling bearing components connected to this operating component, these rolling bearing components being constituted for example by balls 30 and 31 set in cavities 32 and 33 respectively made in the corresponding surface of the operating component 26.

It will be noted that rolling bearing elements constituted for example by balls 34 and 35 may also be set between the stop component 24 and the operating component 26.

These balls are for example set in cavities 36 and 37 made in the corresponding surface of the operating component 26, facing the stop component 24.

It will be understood that in this manner the movement of the operating component 26 and therefore of the operating lever 27 is facilitated insofar as these rolling bearing components and elements facilitate the movement of the various locking elements with respect to one another.

The rolling bearing elements 34 and 35 ensure a correct holding in position of the operating component 26 with respect to the stop component 24 while facilitating the movement of the operating component during the movement of the rolling bearing components 30 and 31 on the ramps 28 and 29 of the intermediate support component 25, so as to separate the facing surfaces of this intermediate support component and of the operating component, so as to separate these locking elements in order to bring the side plates together and to lock the column in position when the operating component 26 is moved.

It goes without saying of course that a single rolling bearing component, a single ramp and a single rolling bearing element may be provided respectively between the operating component and the intermediate support component and between the operating component and the stop component.

The ramps adapted to cooperate with the rolling bearing components may equally, of course, be provided on a surface other than that of the intermediate support component facing the operating component.

Thus, for example, these ramps may be made on the surface of the operating component 26 facing the intermediate support component 25, and the rolling bearing components 30, 31 are then connected to the latter. However, these ramps may equally be provided on the surface of the stop component 24 facing the operating component 26, the rolling bearing components being integral with the latter.

These ramps may equally be provided on the surface of the operating component 26 facing the stop component 24, the rolling bearing components then being connected to that stop component 24.

Although in the embodiment shown two rolling bearing components and two rolling bearing elements have been used interposed between the operating component and the intermediate support component and the stop component respectively, one or more than two rolling bearing components and/or elements may be used.

It will also be noted that the facing surfaces of the operating component 26 and of the intermediate support component 25 or of the stop component 24 comprise projecting stop parts adapted to cooperate with one another so as to delimit a range of movement of the operating component 26 and therefore of the lever 27.

Thus, in the embodiment shown in this FIG. 2, these projecting stop parts are provided on the facing surfaces of the operating component 26 and of the intermediate support component 25.

In fact, on the surface of the operating component 26 facing the intermediate support component 25 a projecting part 38 can be seen which is adapted to cooperate with projecting parts 39 and 40 diametrically opposed on the surface of the intermediate support component, in order to delimit a range of movement of this operating component.

It will also be noted that the surface of the intermediate support component 25 or of the stop component 24, facing the operating component 26, may comprise at least one cavity for reception of the or of each corresponding rolling bearing component or element, in order to delimit a stable locking position.

Thus, in the embodiment shown, two cavities are made in the ramps of the intermediate support component 25 facing the operating component 26, these cavities being referenced 41 and 42 and being adapted to receive the rolling bearing components 30 and 31 with the column in a stable locking position.

This allows the user to be made to feel a discontinuity of force indicating to him a stable locking position of the column.

Of course, these cavities may also be provided in the stop component 24. These cavities are then adapted to receive the rolling bearing elements 34, 35 at the arrival of the operating component 26, and therefore of these rolling bearing elements, with the column in a stable locking position.

Figure 3:
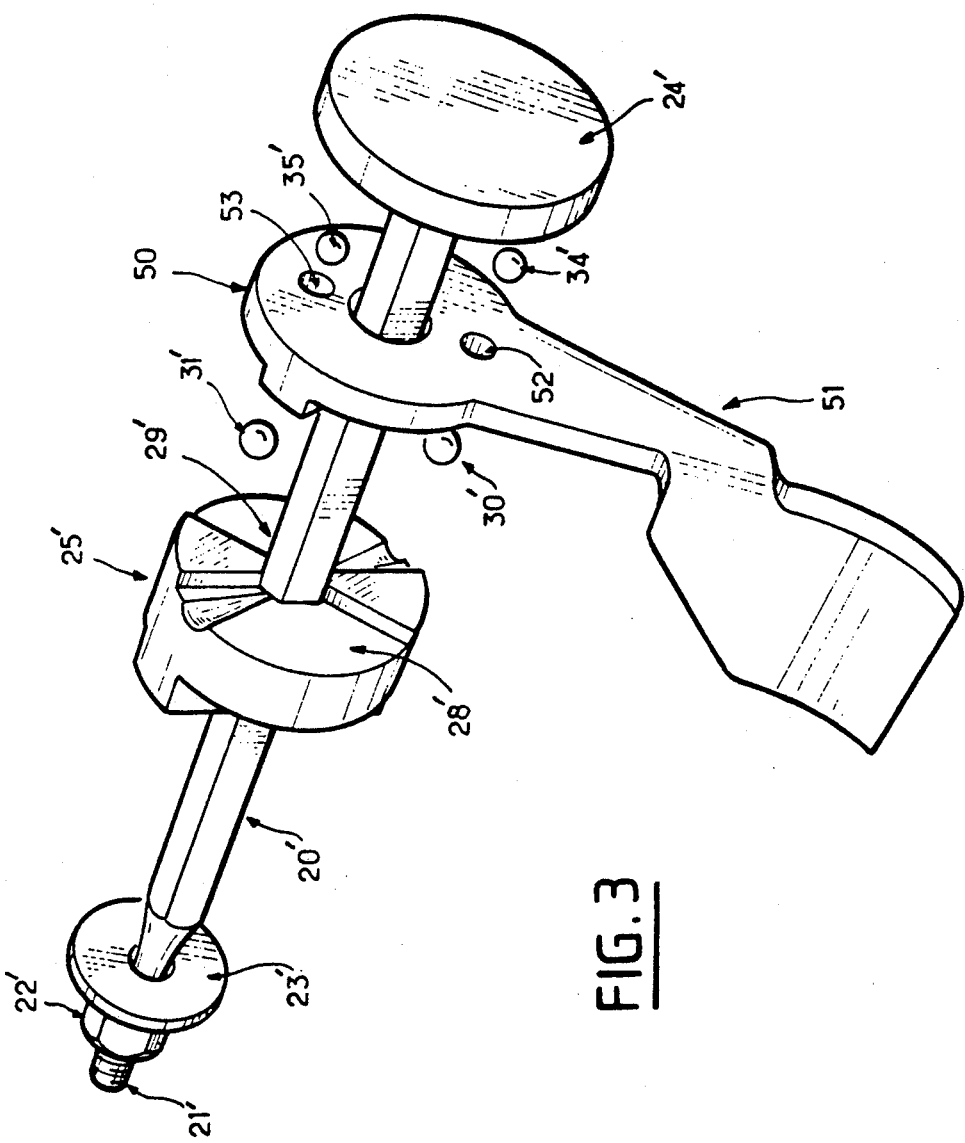
FIG. 3 shows a perspective view of a second embodiment of locking means forming a constituent part of a locking device according to the invention.

FIG. 3 shows a particularly advantageous embodiment of the locking means.

In this figure, the identical elements already described with respect to FIG. 2 bear the same reference numerical (but point) as in that figure. Thus, these locking means still comprise a tie rod 20' at the end 21' of which are provided a nut 22' and a support washer 23'.

The other end of the tie rod comprises the stop component 24' and the intermediate support component 25' between which is arranged an operating component 50. The intermediate support component still comprises ramps 28' and 29' adapted to cooperate with rolling bearing components 30' and 31' connected to the operating component 50. Rolling bearing elements 34' and 35' are also interposed between this operating component 50 and the stop component 24', whereas the operating component 50 is still connected to an operating lever 51.

Whereas in the embodiment shown in FIG. 2, the rolling bearing components and the rolling bearing elements are set in distinct and separate holes, in the embodiment shown in FIG. 3, the or each rolling bearing component interposed between the operating component 50 and the intermediate support component 25' and the or each rolling bearing element interposed between the operating component 50 and the stop component 24' of the second end of the tie rod are arranged two by two in the same cavity 52 and 53 respectively, passing through the operating component 50, and bear against one another so that one projects between the intermediate support component 25' and the operating component 50 and the other between the operating component 50 and the stop component 24'.

It will be understood that in this manner when the operating component 50 is moved, these rolling bearing components and elements constituted by balls turn on one another, and this serves to further reduce the frictions and to facilitate the movement of this operating component 50 and therefore of the operating lever 51.

Moreover, in this embodiment, the operating component 50 constitutes solely a means for displacing these rolling bearing components and elements, and in contrast with the embodiment shown in FIG. 2, no longer participates in the transmission of the tightening between the stop component 24' and the intermediate support component 25'.

In fact, there exists in the embodiment of this figure a link for direct support between the stop component 24', the rolling bearing elements 34' and 35', the rolling bearing components 30' and 31' and the ramps 28' and 29' of the intermediate support component in contact with the other side plate of the support structure.

Although in the various embodiments rolling bearing components and elements constituted by balls are shown, other components such as rollers may be used.

Of course, other arrangements of the holes for receiving of the rolling bearing elements and components may be envisaged.

I claim:

1. A locking device for locking in position an adjustable steering column of a motor vehicle, said adjustable column (1) being of the type having a column support structure (5) which is connected to the rest of the structure of the vehicle and whic comprises fit and second side plates (3, 4) between which is disposed the column (1) and locking means (6) for locking the column in position by bringing thee side plates together, wherein said locking means comprise a tie rod (2) extending between said side plates and having a first end (21) which bears against the said first side plate and a second end which is connected to a plurality of locking elements comprising a stop component (24) at the second end of the tie rod, an intermediate support component (25) in contact with said second side plate of the support structure and movable axially on the tie rod (20), and an operating component (26, 50), disposed between thee stop component (24) and the intermediate support component (25), which is connected to operating means (27, 51) and is movable in rotation in a plane perpendicular to the tie rod (20) between an active position for locking the column (1) and a retracted position for unlocking the column (1);

wherein the operating component (26, 50) has first and second opposite surfaces which respectively face the intermediate support component (25) and the top component (24); and which contain projecting means (30, 31; 34, 35) adapted to cooperate with a facing ramp (28, 29) of the intermediate support component and with the stop component, so as to separate said locking elements from one another and to bring the side plate together in order to lock the column (1) when the operating component (26, 50) is moved; and wherein said projecting means comprise at least one rolling bearing component (30, 31) and at least one rolling bearing element (34, 35) which are disposed as a pair in a same cavity (52, 53) passing through the operating component (50) and said opposite surfaces thereof, so that said bearing component and said bearing element bear against one another, one projecting between the operating component (50) and the intermediate support component (25), and the other projecting between the operating component (50) and the stop component (24).

2. A locking device according to claim 1, wherein there are two rolling bearing components (30, 31) which are located on said first surface of said operating component, on either side of the tie rod 920), and which are each adapted to cooperate with a corresponding facing ramp (28, 29) in a facing surface of the intermediate support component, ad with a corresponding bearing element (34, 38).

3. A locking device according to claim 1 or 2 wherein each rolling bearing component (30, 31) and each rolling bearing element (34, 35) is a ball.

4. A locking device according to claim 1 or 2 wherein confronting surfaces of the operating component (26, 50) and the intermediate support component (25) comprise projecting stop parts (38, 39, 40) adapted to cooperate with one another in order to delimit a range of movement of the operating component (26, 50).

5. A locking device according to claim 2, wherein said facing surface of the intermediate support component (25), has a reception cavity (41, 42) for receiving each corresponding rolling bearing component, thereby delimiting a stable position for locking the column.

6. A locking device according to claim 5, wherein each reception cavity (41, 42) is in a corresponding ramp (28, 29) of the intermediate support component's surface facing the operating component (26, 50) and is adapted to receive a corresponding rolling bearing component.

* * * * *